United States Patent
Beall et al.

(10) Patent No.: US 6,541,407 B2
(45) Date of Patent: Apr. 1, 2003

(54) CORDIERITE BODY

(75) Inventors: Douglas M. Beall, Painted Post, NY (US); David L. Hickman, Big Flats, NY (US); Gregory A. Merkel, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 134 days.

(21) Appl. No.: 09/867,321

(22) Filed: May 29, 2001

(65) Prior Publication Data

US 2002/0004445 A1 Jan. 10, 2002

Related U.S. Application Data

(60) Provisional application No. 60/234,684, filed on Sep. 22, 2000, and provisional application No. 60/208,529, filed on Jun. 1, 2000.

(51) Int. Cl.⁷ .................. C04B 35/195; C04B 38/00; B01D 39/06
(52) U.S. Cl. ............... 501/119; 501/9; 501/128; 501/80; 55/523; 55/DIG. 30; 264/631
(58) Field of Search ............... 501/9, 80, 119, 501/128; 55/523, DIG. 30; 264/631

(56) References Cited

U.S. PATENT DOCUMENTS

| | | | |
|---|---|---|---|
| 3,885,977 A | 5/1975 | Lachman et al. | |
| 3,950,175 A | 4/1976 | Lachman et al. | |
| 4,280,845 A | 7/1981 | Matsuhisa et al. | |
| 4,434,117 A | 2/1984 | Inoguchi et al. | |
| 4,632,683 A | 12/1986 | Fukutani et al. | |
| 4,869,944 A | 9/1989 | Harada et al. | |
| 5,114,643 A | 5/1992 | Beall et al. | |
| 5,258,150 A | 11/1993 | Merkel et al. | |
| 5,262,102 A | 11/1993 | Wada | |
| 5,409,870 A | 4/1995 | Locker et al. | |
| 5,545,243 A | 8/1996 | Kotani et al. | |
| 6,077,796 A | 6/2000 | Beall et al. | |
| 6,087,281 A | 7/2000 | Merkel | |
| 6,101,793 A | 8/2000 | Nagai et al. | |
| 6,206,944 B1 | 3/2001 | Hickman | |
| 6,210,626 B1 | 4/2001 | Cornelius et al. | |
| 6,319,870 B1 * | 11/2001 | Beall et al. | 501/119 |
| 6,322,605 B1 * | 11/2001 | He et al. | 55/523 |
| 6,328,779 B1 * | 12/2001 | He et al. | 55/523 |
| 6,391,813 B1 * | 5/2002 | Merkel | 501/119 |
| 6,464,744 B2 * | 10/2002 | Cutler et al. | 55/482 |

FOREIGN PATENT DOCUMENTS

| | | |
|---|---|---|
| JP | 2001-340718 | 12/2001 |
| WO | 02/41972 A1 | 5/2002 |

* cited by examiner

*Primary Examiner*—Karl Group
(74) *Attorney, Agent, or Firm*—Anca C. Gheorghiu

(57) ABSTRACT

A ceramic comprising predominately a cordierite-type phase approximating the stoichiometry $Mg_2Al_4Si_5O_{18}$ and having a coefficient of thermal expansion (25–800° C.) of greater than $4 \times 10^{-7}/°$ C. and less than $13 \times 10^{-7}/°$ C. and a permeability and a pore size distribution which satisfy the relation 2.108 (permeability)+18.511 (total pore volume)+0.1863 (percentage of total pore volume comprised of pores between 4 and 40 micrometers)>24.6. The ceramic is suitable in the fabrication of cellular, wall-flow, diesel particulate filters having a pressure drop in kPa that at an artificial carbon soot loading of 5 grams/liter and a flow rate of 26 scfm is less than 8.9–0.035 (number of cells per square inch)+300 (cell wall thickness in inches), a bulk filter density of at least 0.60 g/cm³ and a volumetric heat capacity of at least 0.67 J cm⁻³ K⁻¹ as measured at 500° C.

49 Claims, 5 Drawing Sheets

CORDIERITE BODY

This application claims the benefit of U.S. Provisional Applications Nos. 60/208,529, filed Jun. 1, 2000, entitled "Cordierite Body and Method of Making the Same", and 60/234,684, filed Sep. 22, 2000, entitled "Cordierite Body", both by Beall et al.

BACKGROUND OF THE INVENTION

The present invention relates to cordierite bodies of high permeability and tailored microstructure suitable for use as diesel particulate filters in applications where a low pressure drop across the length of the filter is required.

Recently much interest has been directed towards the diesel engine due to its efficiency, durability and economical aspects. However, diesel emissions have come under attack both in the United States and Europe, for their harmful effects on the environment and on humans. As such, stricter environmental regulations will require diesel engines to be held to the same standards as gasoline engines. Therefore, diesel engine manufacturers and emission-control companies are working to achieve a diesel engine which is faster, cleaner and meets the most stringent of requirements under all operating conditions with minimal cost to the consumer.

One of the biggest challenges in lowering diesel emissions is controlling the levels of diesel particulate material present in the diesel exhaust stream. In 1998 diesel particulates were declared a toxic air contaminant by the California Air Resources Board. Legislation has been passed that regulates the concentration and particle size of diesel particulate pollution originating from both mobile and stationary sources.

Diesel particulate material is mainly carbon soot. One way of removing the carbon soot from the diesel exhaust is through diesel traps. The most widely used diesel trap is the diesel particulate filter which filters the diesel exhaust by capturing the soot on the porous walls of the filter body. The diesel particulate filter is designed to provide for nearly complete filtration of soot without significantly hindering the exhaust flow.

In the industry cordierite ($2MgO-2Al_2O_3-5SiO_2$) has been the cost-effective material of choice for diesel particulate filters for heavy duty vehicles due to its combination of excellent thermal shock resistance, filtration efficiency, and durability under most operating conditions. Historically, cordierite diesel particulate filters have had cell geometries such as 100 cell/in$^2$ with 0.017 inch walls and 200 cell/in$^2$ with 0.012 inch walls, with alternate channels plugged on opposite faces to force the engine exhaust gas to pass through the porous walls of the filter body.

As the layer of soot collects on the surfaces of the inlet channels of the diesel particulate filter, the lower permeability of the soot layer causes a gradual rise in the back pressure of the filter against the engine, causing the engine to work harder. Once the carbon in the filter has accumulated to some level, the filter must be regenerated by burning the soot, thereby restoring the back pressure to low levels. Normally, the regeneration is accomplished under controlled conditions of engine management whereby a slow burn is initiated and lasts a number of minutes, during which the temperature in the filter rises from about 400–600° C. to a maximum of about 800–1000° C.

The highest temperatures during regeneration tend to occur near the exit end of the filter due to the cumulative effects of the wave of soot combustion that progresses from the entrance face to the exit face of the filter as the exhaust flow carries the combustion heat down the filter. Under certain unusual circumstances, a so-called "uncontrolled regeneration" can occur when the onset of combustion coincides with, or is immediately followed by, high oxygen content and low flow rates in the exhaust gas (such as engine idling conditions). During an uncontrolled regeneration, the combustion of the soot (a reaction which is already highly exothermic) may produce temperature spikes which would exceed the melting point of cordierite, and can thermally shock and crack, or even melt, the filter.

In addition to capturing the carbon soot, the filter also traps metal oxide "ash" particles that are carried by the exhaust gas. These particles are not combustible and, therefore, are not removed during regeneration. However, if temperatures during uncontrolled regenerations are sufficiently high, the ash may eventually sinter to the filter or even react with the filter resulting in partial melting.

A significant problem associated with conventional cordierite diesel particulate filters is susceptibility to damage during regeneration of the filter under uncontrolled conditions that promote unusually high temperatures.

It would be considered an advancement in the art to obtain a cordierite diesel particulate filter which not only survives the numerous controlled regenerations over its lifetime, but also the much less frequent but more severe uncontrolled regenerations. This survival includes not only that the diesel particulate filter remains intact and continues to filter, but that the back pressure against the engine remains low.

The present invention provides such a filter and a method of making the same.

SUMMARY OF THE INVENTION

The instant invention is founded upon the discovery of a cordierite structure possessing high permeability and a microstructure with a unique combination of porosity and pore size distribution which is especially useful in the fabrication of diesel particulate filters which possess high thermal durability coupled with a low pressure drop along the length of the filter such that there exists a low back pressure against the engine, resulting in a more efficient engine.

The inventive structure comprises predominately a cordierite-type phase approximating the stoichiometry $Mg_2Al_4Si_5O_{18}$ and having a coefficient of thermal expansion (25–800° C.) of greater than $4 \times 10^{-7}$/° C. and less than $13 \times 10^{-7}$/° C. and a permeability and a pore size distribution which satisfy the relation 2.108 (permeability)+18.511 (total pore volume)+0.1863 (percentage of total pore volume comprised of pores between 4 and 40 micrometers)>24.6.

The inventive structure is suitable in high temperature applications such as a diesel particulate filter of high volumetric heat capacity and which exhibits a low pressure drop across the length of the filter. In a preferred embodiment the filter is a honeycomb design having an inlet end and an outlet end and a multiplicity of cells extending from the inlet end to the outlet end, the cells having porous walls, wherein part of the total number of cells at the inlet end are plugged along a portion of their lengths, and the remaining part of cells that are open at the inlet end are plugged at the outlet end along a portion of their lengths, so that an engine exhaust stream passing through the cells of the honeycomb from the inlet end to the outlet end flows into the open cells, through the cell walls, and out of the structure through the open cells at the outlet end.

The inventive filter has a pressure drop across the length of the filter, expressed in kPa at an artificial carbon soot loading of 5 grams/liter and a flow rate of 26 standard cubic feet per minute (scfm), of less than 8.9−0.035 (number of cells per square inch)+300 (cell wall thickness in inches); a bulk filter density of at least 0.60 g/cm³ and a volumetric heat capacity of at least 0.67 J cm³ K⁻¹ as measured at 500° C.

The invention is also a method of making the cordierite body based upon the use of certain raw materials having specific particle size restrictions. Specifically the method includes forming a mixture of a talc source having a morphology index greater than about 0.75 and an average particle size greater than 15 micrometers but less than 35 micrometers; an alumina source having an median particle size between 4.6 and 25 micrometers; a silica source having a median particle size between 10 and 35 micrometers; shaping the mixture into a green structure; optionally drying and firing into a final product structure. Kaolin may be added but not be more than the quantity (in weight percentage) given by the equation 4.0 (median particle size of the alumina source)−18.4.

DETAILED DESCRIPTION OF THE INVENTION

Figure 1:
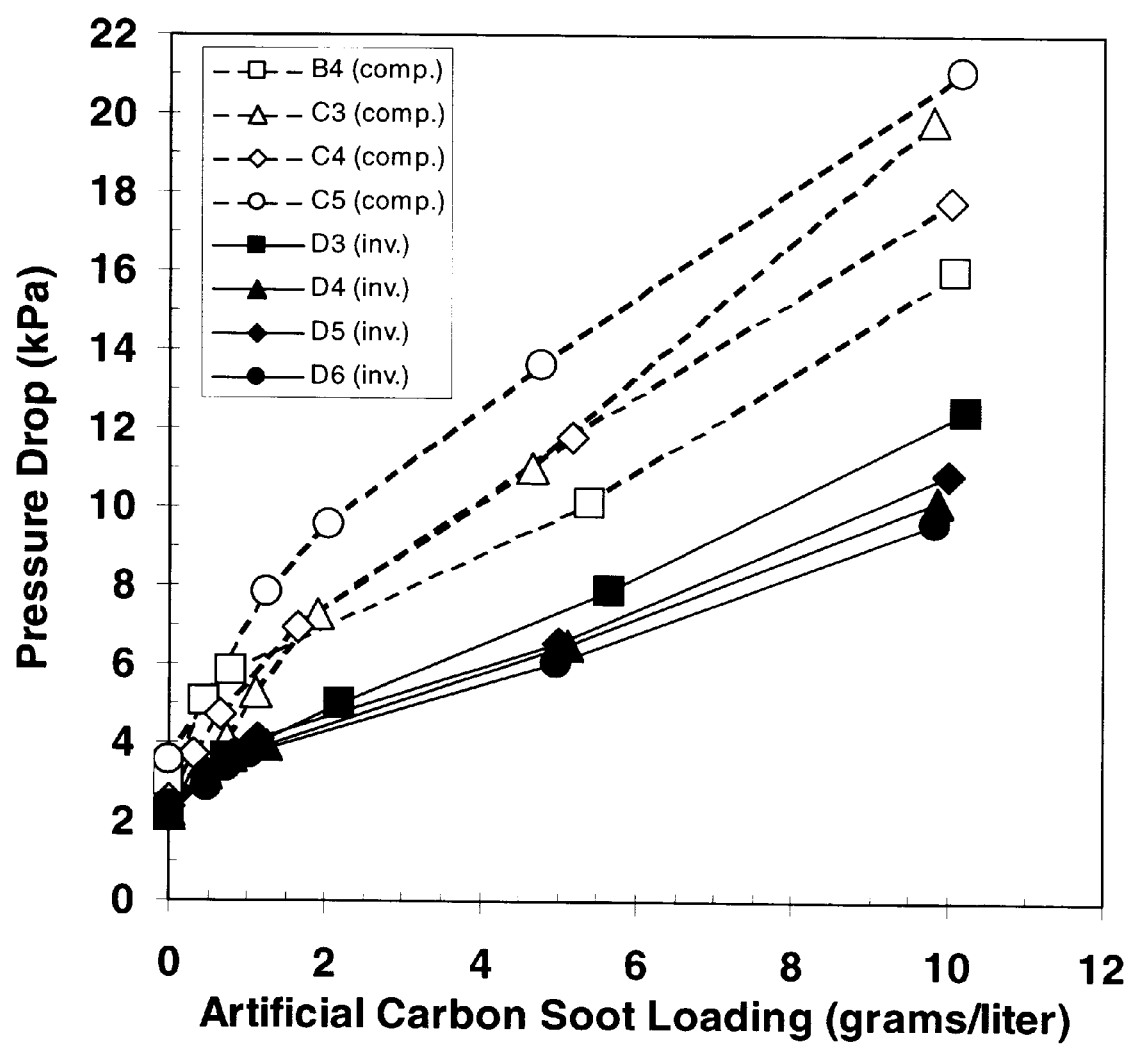
FIG. 1 illustrates the pressure drop across a filter versus carbon soot loading for gas flow rate of 26.25 scfm for cordierite filters having about 200 cells per square inch and a channel wall thickness of about 0.022 inches.

The present invention relates to a structure which is composed predominately of a cordierite-type phase, that is, a crystalline phase in which the arrangement of the atoms in the crystal lattice is generally similar to that of the minerals cordierite or indialite. The composition of the cordierite phase is preferably close to that of $Mg_2Al_4Si_5O_{18}$; however, limited substitution of other constituents such as Fe (iron), Co (cobalt), Ni (nickel), and Mg (manganese) for the Mg (magnesium), Ga (gallium) for the Al (aluminum), and Ge (germanium) for the Si (silicon) is acceptable. Also, the cordierite phase may contain up to three atoms of an alkali (Group IA) metal, two atoms of an alkaline earth metal (Group IIA), or one atom of a rare earth metal (scandium, yttrium, or a lanthanide metal) per 54 oxygens. These substituents would be expected to occupy the normally vacant "channel sites" in the crystal structure of the cordierite-type phase, although their limited substitution for Mg might also occur. Incorporation of these elements into the cordierite crystal structure may be coupled with other chemical substitutions, such as a change in Al/Si ratio, to preserve charge balance.

The inventive structure has a pore size distribution and permeability that satisfies the relation P>24.6, where P is defined as:

$$P=2.108 \text{ (permeability)}+18.511 \text{ (total pore volume)}+0.1863 \text{ (percentage of total pore volume comprised of pores between 4 and 40 micrometers)}. \quad (1)$$

In Equation (1), permeability is in units of $10^{-12}$ m², total pore volume is measured by mercury porosimetry and is in units of ml/g. The percentage of the total pore volume comprised of pores between 4 and 40 micrometers is calculated from the mercury porosimetry data by computing the difference between the cumulative mercury intrusion in ml/g at 4 micrometers and 40 micrometers, dividing by the total mercury intrusion in ml/g, and multiplying the result by 100.

Accordingly, the permeability of the inventive structures is at least $0.7 \times 10^{-12}$ m², preferably of at least about $1.0 \times 10^{-12}$ m², more preferably of at least about $1.5 \times 10^{-12}$ m², and still more preferably of at least about $2.0 \times 10^{-12}$ m².

The total pore volume, also known as the intrusion volume, is at least 0.25 cm³/g, more preferably at least 0.30 cm³/g, and still more preferably at least 0.35 cm³/g. The total volume percent porosity, as measured by mercury porosimetry, is preferably at least about 38% by volume, more preferably at least 42% by volume, and still more preferably at least 47% by volume.

The median pore diameter of the inventive structure is at least 4 micrometers and less than 40 micrometers when the inventive structure is used as a diesel particulate filter. The median pore diameter of the inventive structure is preferably at least 10 micrometers and less than 25 micrometers. The median pore diameter of the inventive structure is more preferably at least 14 micrometers and less than 20 micrometers.

The percentage of the total pore volume comprised of pores between 4 and 40 micrometers is preferably at least 80%, more preferably at least 85%, and still more preferably at least 90%.

The mean coefficient of thermal expansion (CTE) from 22° to 800° C., as measured by dilatometry, in the inventive cordierite structures is greater than $4 \times 10^{-7}/°$ C. and less than $13 \times 10^{-7}/°$ C., preferably greater than $4 \times 10^{-7}/°$ C. and less than $10 \times 10^{-7}/°$ C., more preferably greater than $4 \times 10^{-7}/°$ C. and less than $8 \times 10^{-7}/°$ C., and most preferably greater than $4 \times 10^{-7}/°$ C. and less than $6 \times 10^{-7}/°$ C.

The CTE of the inventive structure is lower than the mean lattice CTE of cordierite, which is about $15 \times 10^{-7}/°$ C. to $18 \times 10^{-7}/°$ C., due to microcracking of the ceramic body. Optionally, the cordierite body may also exhibit a preferred, non-random crystallographic orientation of the cordierite crystallites that comprise the body. When the body has a tubular, cellular, or honeycomb type geometry, it is preferred that the cordierite crystals are preferentially oriented with their crystallographic c-axes lying within a plane that is parallel to the formed surface of the walls of the body. This preferred orientation of the crystallites contributes to a reduction in the thermal expansion of the body as measured along a direction parallel to the surface of the walls because cordierite exhibits a negative CTE in the direction of the crystal c-axis.

The inventive cordierite bodies are especially suited as diesel particulate filters, especially in applications where regeneration of the filter by burning of the carbon soon can result in locally high temperatures within the filter, thus necessitating excellent thermal shock resistance and a high melting point of the filter. Specifically, the inventive cordierite bodies are especially suited as multicellular honeycomb structures having a high filter volumetric heat capacity, a low pressure drop between the entrance and exit faces of the filter, a low CTE, and a high filtration efficiency.

The honeycomb structure has an inlet and outlet end or face, and a multiplicity of cells extending from the inlet end to the outlet end, the cells having porous walls. The inventive filters have cellular densities from about 100 cells/in$^2$ (15.5 cells/cm$^2$) to about 400 cells/in$^2$ (62 cells/cm$^2$).

A portion of the cells at the inlet end or face are plugged with a paste having same or similar composition to that of the filter, as described in U.S. Pat. No. 4,329,162 which is herein incorporated by reference. The plugging is only at the ends of the cells which is typically to a depth of about 5 to 20 mm, although this can vary. A portion of the cells on the outlet end but not corresponding to those on the inlet end are plugged. Therefore, each cell is plugged only at one end. The preferred arrangement is to have every other cell on a given face plugged as in a checkered pattern.

This plugging configuration allows for more intimate contact between the exhaust stream and the porous wall of the substrate. The exhaust stream flows into the substrate through the open cells at the inlet end, then through the porous cell walls, and out of the structure through the open cells at the outlet end. Filters of the type herein described are known as a "wall flow" filters since the flow paths resulting from alternate channel plugging require the exhaust being treated to flow through the porous ceramic cell walls prior to exiting the filter.

Diesel particulate filters having a low pressure drop across the length of the filter and lower back pressure against the engine have been achieved than is possible with cordierite filters in the prior art.

The pressure drop across the filter is a function of the accumulation of the carbonaceous soot on the walls of the diesel particulate filter. As amount of soot accumulated increases, it creates a progressive increase in the resistance to flow of the exhaust gas through the walls of the filter and carbon soot layer. This resistance to flow is manifested as a pressure drop that can be measured across the length of the filter, and results in an increased back pressure against the engine. The pressure drop increase at a given loading of soot (in grams/liter) depends upon the initial, "clean", pressure drop of the filter; the geometric surface area of the inlet channels of the filter; the packing density of the soot on the filter walls; and the extent to which the soot penetrates the porosity of the filter walls, especially during the early stages of soot deposition. Thus, the number of channels per unit area and the porosity and pore size distribution of the filter influence pressure drop, which in turn, affects fuel economy.

Accordingly, the pressure drop in kilopascals (kPa) of the inventive filters is less than 8.9–0.035 (number of cells per square inch)+300 (wall thickness in inches) when measured at a flow rate of 26.25 scfm (standard cubic feet per minute) and loaded with 5 grams/liter of artificial carbon soot.

In addition to a low pressure drop, the inventive filters also have high volumetric heat capacity. High volumetric heat capacity is desirable because it reduces the magnitude of the temperature increase of the filter during regeneration. Lower temperatures during regeneration result in less sintering of the metal oxide ash and thus easier removal of the ash during cleaning of the filter, and result in less reaction of the ash with the filter and thus increased lifetime of the filter.

The filter volumetric heat capacity, $C_{p,f}$, is expressed in units of Joules centimeter$^{-3}$ Kelvin$^{-1}$ (J cm$^{-3}$ K$^{-1}$), and is defined by the relation $C_{p,f}=(D_f)(C_{p,c})$, where $D_f$ is the bulk density of the filter in units of grams centimeter$^{-3}$ (g cm$^{-3}$) and $C_{p,c}$ is the specific heat capacity of cordierite in units of Joules gram$^{-1}$ Kelvin$^{-1}$ (J g$^{-1}$ K$^{-1}$). The bulk density of the filter is equal to the mass of the filter (in grams) divided by the volume of the filter (in cm$^3$) as defined by its external dimensions. The mass of the filter includes the mass of the outer skin of the filter, the walls that form the channels within the filter, and the plugs located in the entrance or exit ends of the channels. The volume of the filter includes the volume occupied by the outer skin of the filter, the filter walls, the plugs in the ends of the filter, and the open channels within the filter. Thus, the filter volumetric heat capacity depends upon the number of channels per unit area of the filter face (also known as the "cell density"), the thickness of the walls, the amount of porosity in the walls, the thickness of the outer skin, the number and depth of the ceramic plugs, and the porosity of the plugs. Of these parameters, the cell density, wall thickness, and porosity of the walls are typically the most important in contributing to the filter volumetric heat capacity.

Accordingly, it is preferred to have a filter volumetric heat capacity of at least 0.67 J cm$^{-3}$ K$^{-1}$ as measured at about 500° C. Preferably, the filter volumetric heat capacity at 500° C. is at least 0.76 J cm$^{-3}$ K$^{-1}$, and more preferably at least 0.85 J cm$^{-3}$ K$^{-1}$. Correspondingly, to achieve this volumetric heat capacity the density of the bulk filter must be at least 0.60 g cm$^{-3}$, preferably 0.68 g cm$^{-3}$, and more preferably 0.77 g cm$^{-3}$.

Although, the preferred embodiment discloses a diesel particulate filter with a high volumetric heat capacity, the inventive structure is also suitable for the fabrication of diesel particulate filters of a lower volumetric heat capacity.

Filtration efficiencies up to and in excess of 90% of the diesel exhaust particulate matter (by weight) can be achieved with the inventive filters. Efficiencies, of course, will vary with the range and distribution of the size of the particulates carried within the exhaust stream.

The invention also relates to a method for fabricating the inventive cordierite structure or body by forming a mixture from certain raw materials having specific particle size restrictions. The raw materials include one or more talc sources, one or more alumina-forming sources, and one or more silica-forming sources. Optionally, the raw material mixture may also contain kaolin. Raw materials are blended together with organic constituents that may include plasticizers, lubricants, binders, and solvents. Water may also optionally be added. The mixture is shaped into a green body, optionally dried, and then fired to form the product structure.

The Raw Materials

In the present invention, the median particle sizes of the raw materials are measured in micrometers, and are derived from the volumetric distribution of particle sizes as measured by a laser diffraction technique.

Talc Source

The talc must have an average median particle size greater than about 15 micrometers, and preferably greater than about 20 micrometers, but must have a median particle size less than 35 micrometers.

The talc must have a platelet morphology to promote low CTE in the fired body. It is preferred that the talc possess a morphology index greater than about 0.75. The morphology index is a measure of the degree of platiness of the talc, as described in U.S. Pat. No. 5,141,686 herein incorporated by reference. One typical procedure for measuring the morphology index is to place the sample in a holder so that the orientation of the platy talc is maximized within the plane of the sample holder. The x-ray diffraction pattern is then determined for this oriented talc. The morphology index, M, semi-quantitatively relates the platy character of the talc to its XRD peak intensities using the following equation:

$$M = \frac{I_x}{I_x + 2I_y}$$

where $I_x$ is the intensity of the (004) reflection and $I_y$ is that of the (020) reflection.

Talc may be supplied as a combination of two or more talc powders. When two or more talc powders are used the "weighted average of the median particle sizes" of the talc powders is computed from the formula $$d_{50}(talc) = \frac{(W_{talc1})(d_{50,talc1}) + (W_{talc2})(d_{50,talc2}) + \ldots + (W_{talc\,n})(d_{50,talc\,n})}{(W_{talc1}) + (W_{talc2}) + \ldots + (W_{talc\,n})}$$

where $d_{50}$(talc) is the weighted average of the median particle sizes of the talcs in the mixture, in micrometers; W is the weight percentage of each talc in the total raw material mixture; $d_{50}$ is the median particle size in micrometers for each talc; and talc-1, talc-2, ... talc-n represent each of the talc sources used in the raw material mixture. For example, if a raw material mixture contains 20 weight percent of a first talc having a median particle size of 10 micrometers and 20 weight percent of a second talc having a median particle size of 22 micrometers, then the weighted average of the median particle sizes of the talcs is 16 micrometers, satisfying the restriction on the particle size of the talc. The talc may also be provided as a calcined talc.

Alumina Source

The alumina-forming source is a powder which, when heated to a sufficiently high temperature in the absence of other raw materials, yields substantially pure aluminum oxide, and includes alpha-alumina, a transition alumina such a gamma-alumina or rho-alumina, boehmite, aluminum hydroxide, and their mixtures.

It is preferred that the amount of aluminum hydroxide, $Al(OH)_3$, comprise at least 10% by weight of the raw material mixture. When more than one alumina-forming source is used, the weighted average of the median particle sizes of the alumina-forming sources in a raw material mixture is defined as $$d_{50}(Al_2O_3 - \text{forming source}) =$$
$$\frac{(W_{Al-2})(d_{50,Al-1}) + (W_{Al-2})(d_{50,Al-2}) + \ldots + (W_{Al-n})(d_{50,Al-n})}{(W_{Al-1}) + (W_{Al-2}) + \ldots + (W_{Al-n})}$$

where W is the weight percentage of each alumina-forming source in the raw material mixture, $d_{50}$ is the median particle size in micrometers of each alumina-forming source, and Al-1, Al-2, ... Al-n represent each alumina-forming source used in the mixture.

It is preferred that the weighted average of the median particle sizes of the alumina-forming sources have a median particle size of between 4.6 micrometers to 25 micrometers.

In a preferred embodiment the talc source has a median particle size of 18–30 micrometers and the alumina source has a median particle size of 7 to 15 micrometers.

Silica Source

The silica-forming source includes, but is not limited to, quartz, cristobalite, non-crystalline silica such as fused silica or a sol-gel silica, zeolite, and diatomaceous silica, and combinations thereof.

The weighted average of the median particle sizes of the silica sources is between 10 micrometers and 35 micrometers.

When more than one silica source is used, the weighted average of the median particle sizes of the silica sources is defined similarly to the analogous parameter for the previous raw materials.

Kaolin Source

Optionally, the mixture may contain kaolin. If present, the weight percentage of kaolin must be less than an amount defined by the quantity 4.0 (median particle size of the alumina source)–18.4. Amounts of kaolin greater than this value will result in a computed P value of less than 24.6 and will result in higher pressure drops.

In the inventive structures, pressure drop decreases with increasing median particle sizes of the talc, alumina-forming, and silica sources, and with the weight percentage of $Al(OH)_3$ in the raw material mixture, and pressure drop increases with increasing amount of kaolin in the mixture.

An advantage of the present invention is the elimination of pore-forming agents, such as graphite, from the raw material mixture. A pore former is a fugitive particulate material which evaporates or undergoes vaporization by combustion during drying or heating of the green body to obtain a desired, usually larger porosity and/or coarse median pore diameter than would be obtained otherwise.

A number of benefits flow from the elimination of pore-forming agents including reduced firing times, reduced variability in physical properties, such as back pressure and coefficient of thermal expansion, and reduced gradients in these properties between the inner and outer portions within a single filter.

To more fully illustrate the invention, the following non-limiting examples are presented. All parts, portions and percentages are on a weight basis unless otherwise stated.

EXAMPLES

Inventive and comparative examples of cordierite bodies were prepared by weighing out the dry ingredients, mixing them with water and organic liquids and kneading the mixture in a stainless steel muller to form a plastic mass, and extruding the mixture into a ribbon having a thickness of about 0.020 inches and cellular honeycomb bodies consisting of multiple parallel channels of square cross section. The cellular bodies contained approximately 100 or 200 cells per square inch and had wall thicknesses of about 0.012 inches, 0.017 inches and 0.022 inches. After drying, the parts were fired at a rate of between 15 and 100° C./hour to a maximum temperature of 1405° to 1430° C. and held for 6 to 25 hours. The cellular bodies were approximately 2 inches in diameter and were cut to about 6 inches in length. For each fired body, the alternate channels of one face were plugged to a depth of about 6 to 12 mm with a cementitious material, after which the ends of the channels that were open on the first face were similarly plugged at their ends on the second face, such that each channel was plugged at one end and open at the other end. Channels that are open (not plugged) on the face of the filter through which a gas stream enters are referred as the "inlet" channels.

Percent porosity, pore volume (intrusion volume), pore size distribution, and median pore size were determined by mercury porosimetry. The weight percentages of mullite, alumina, and spinel in the fired body were measured by powder x-ray diffractometry using internal standards.

Permeability was measured on the fired ribbon or pieces of cell wall using a Perm Automated Porometer® Version 6.0 (Porous Materials, Inc., Ithaca, N.Y.). The value of the permeability is obtained as follows. A piece of fired cordierite ribbon or cell wall is mounted with epoxy onto a disc-shaped sample holder which has a circular opening. The epoxy is applied around the perimeter of the opening such that the sample covers the opening and such that no air can pass through the opening without passing through the sample, and such that the area of the sample through which the air passes is very nearly the same as the area of the circular opening of the sample holder. The sample is then placed in the chamber of the automated porometer and a differential air pressure is applied across the sample. The volumetric air flow on the outlet end of the sample is measured as a function of the pressure applied to the inlet face of the sample. The specific permeability, k, is then computed from the following relation:

$$k = \frac{\eta Q L}{AP}$$

where $\eta$ is the viscosity of air at room temperature in units of megapascal seconds, L is the thickness of the sample in units of meters, Q is the uniaxial volume flow rate of air through the sample in cubic meters per second, A is the area through which air is allowed to pass through the sample, approximately equal to the area of the opening of the sample holder, in units of square meters, and P is the differential pressure across the thickness of the sample in units of megapascals. The specific permeability, also referred to as permeability, is thus expressed in units of square meters, $m^2$.

The I-ratio is a measure of the extent to which the crystallographic c-axes of the cordierite crystals are preferentially oriented parallel to the surface of the channel walls of the filter body. The I-ratio ($I_R$), as first described in U.S. Pat. No. 3,885,977, is used to describe the degree of preferred orientation according to the relation:

$$I_R = \frac{I_{(110)}}{I_{(110)} + I_{(002)}}$$

where $I_{(110)}$ and $I_{(002)}$ are the peak heights of the X-ray reflections from the (110) and (002) crystallographic planes respectively, based on a hexagonal cordierite crystal structure; these reflections correspond to d-spacings of about 4.90 Å and 4.68 Å, respectively.

The so-called transverse I-ratio is measured by the impingement of x-rays on the flat as-formed wall surfaces of the honeycomb ceramic body. This measurement of the transverse I-ratio is performed by slicing the cordierite honeycomb substrate to expose a flat section of a wall of the honeycomb and subjecting this wall surface to X-ray diffraction and calculating the intensities of the observed diffraction peaks. If the obtained value is greater than 0.65, which is the I-ratio for a body of completely randomly oriented crystals (i.e., a powder), then it can be inferred that the cordierite crystallites have a preferred orientation; i.e., a majority of the cordierite crystallites are oriented with their c-axes in the plane of the wall. An I-ratio of 1.00 would imply that all of the cordierite crystallites were oriented with their negative expansion axis within the plane of the wall, and thus the closer the transverse I-ratio is to a value of 1.00, the higher the degree of this planar orientation.

The pressure drop across the cellular filter bodies was measured as follows. Each filter was wrapped in a ceramic fibrous mat and securely encased in a cylindrical metal holder. The holder and filter were attached at each end to metal pipes through which a stream of air was passed. The pressure drop across the filter, that is, the pressure difference between the inlet and outlet faces, was measured as a function of gas flow rate. Flow rates of 1.9 to 26.25 standard cubic feet per minute (scfm) were utilized for all samples. The pressure drops for these samples, prior to the introduction of carbon particles into the filters, are referred to as the "clean" pressure drops, and these clean pressure drops increase with increasing flow rate.

After the clean pressure drops were measured, the samples were transferred to a second facility where they were again attached to a metal pipe into which a stream of air was passed. A very fine carbon soot was then aspirated into this air stream for a period of time, thereby partially loading the filter with carbon by coating the walls of the inlet channels with a layer of carbon particles. The sample was then taken back to the first apparatus and its pressure drop re-measured as a function of flow rate. This process was repeated for various increasing levels of carbon soot loading. Thus, pressure drops were determined as a function of flow rate and mass of carbon soot contained within the filter. In most cases, levels of carbon soot loading ranged from approximately 0.3 to 10.0 grams per liter of filter volume.

The conditions of the test method described above are meant to provide a relative comparison of the behaviors of the filters in environments of flowing gas and carbon soot build-up on the walls of the filter, analogous to the environment that a filter would experience if placed in the exhaust path of a diesel engine. To minimize reduction in engine performance, it is desired that the pressure drop of a filter that is loaded with a given mass per volume of carbon soot be as low as possible.

FIG. 1 shows the pressure drop versus carbon soot loading for comparison and inventive examples from Tables B to D.

The maximum temperatures within the filters achieved during regeneration (burning) of the carbon soot under simulated uncontrolled conditions were measured at various soot loadings for one low bulk density filter and one high bulk density filter. To characterize the thermal response of the filters, 2-inch diameter by 6-inch long filters having bulk densities of 0.47 g/cm$^3$ (49% porosity, 100 cells inch$^2$ and 0.017 inch walls) and 0.71 g/cm$^3$ (45% porosity, 200 cells inch$^2$ and 0.019 inch walls) were wrapped in a compliant ceramic fiber mat, canned, and then loaded with artificial soot by aerating the fine carbon powder into an air stream. After loading to a desired mass of carbon per unit volume of the filter, the filter was transferred to the regeneration test unit. A thermocouple was placed 25 mm inside the center of the exit end of the filter, the hottest spot in the filter as found through extensive thermocouple monitoring of filters. A gas consisting of 18% $O_2$+82% $N_2$ was flowed at a rate of 40 liters/minute through the sample at an inlet temperature of <100° C. The temperature was gradually raised, and when the filter temperature reached ~600° C., an exotherm was observed and the pressure drop began to fall as a result of soot ignition. This low flow rate and high oxygen content simulate conditions of a severe uncontrolled regeneration that could occur on a diesel engine vehicle. The maximum temperature within the filter was recorded for each level of soot loading. Soot loading levels investigated ranged from about 8 to about 24 grams/liter, the maximum level depending upon the filter.

Figure 2:
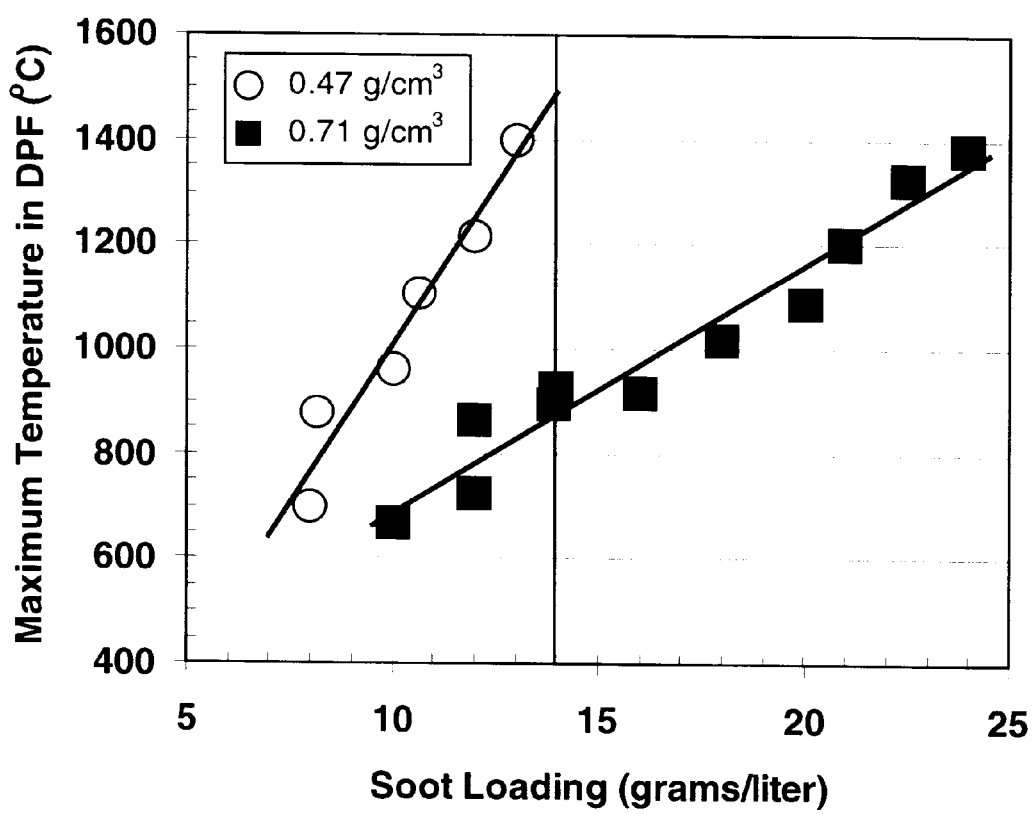
FIG. 2. shows the maximum temperature achieved within a filter during an uncontrolled regeneration at high exhaust gas oxygen contents and low flow rates versus soot loading level for a low bulk density and a high bulk density filter.

The results of the regeneration experiments, shown in FIG. 2, demonstrate the benefit of the higher bulk density filter in reducing the temperature generated within the filter during regeneration under conditions of low flow rate and high oxygen content of the exhaust gas.

Table A provides the median particle sizes of the raw materials as measured by a laser diffraction technique such as utilized by a Microtrac FRA9200 Series particle size analyzer. An exception to this is the particle size of the boehmite powder. The boehmite powder consists of 15 micron agglomerates that are easily broken up into smaller aggregates of primary particles during the mixing and mulling of the raw materials and the formation of the green body. The primary particle size of this powder is reported by the vendor to be about 125 nanometers.

Tables B and C provide comparison examples for which the soot-loaded pressure drop, computed "P" parameter, or CTE lie outside the range of the present invention. Table D provides examples for which the properties lie within the range of the present invention.

Example B1 shows that the use of a 50 micron talc results in a low percentage of porosity between 4 and 40 micrometers and a high pressure drop.

Example B2 demonstrates that the use of 16 weight percent kaolin with alumina sources having an average median particle size finer than 4.6 micrometers results in a filter with a high pressure drop.

Examples B3 and B4 illustrates that the use of 16 weight percent kaolin with alumina sources having an average median particle size finer than 4.6 micrometers results in a filter with a high pressure drop even when 20 percent graphite pore former is added to the raw material mixture.

Examples C1, C3, and C4 show that the use of a 40 micron or 50 micron talc results in a low percentage of porosity between 4 and 40 micrometers and a high pressure drop.

Example C2 demonstrate that, even when both the talc and quartz are of a coarse particle size, an average of the median particles sizes of the alumina sources of 5.5 micrometers is too fine to achieve a low pressure drop when 4 weight percent kaolin is present in the raw material mixture.

Examples D1 and D2 demonstrates that high values for the computed "P" parameter within the inventive range are achieved with the use of a 23 micron talc, a 25 micron quartz powder, and alumina sources having an average median particle size of 5.5 or 8.7 micrometers when no kaolin is present in the raw material mixture.

Examples D3 to D6 illustrate that high values for the computed "P" parameter within the inventive range and low measured pressure drops are obtained even when 8 to 16 percent kaolin is present in the raw material mixture when the average of the median particle sizes of the alumina sources is sufficiently coarse.

Examples of pressure drop increase versus soot loading for a flow rate of 26.25 scfm are presented in FIG. 1, demonstrating the lower pressure drop of the inventive examples.

Figure 3:
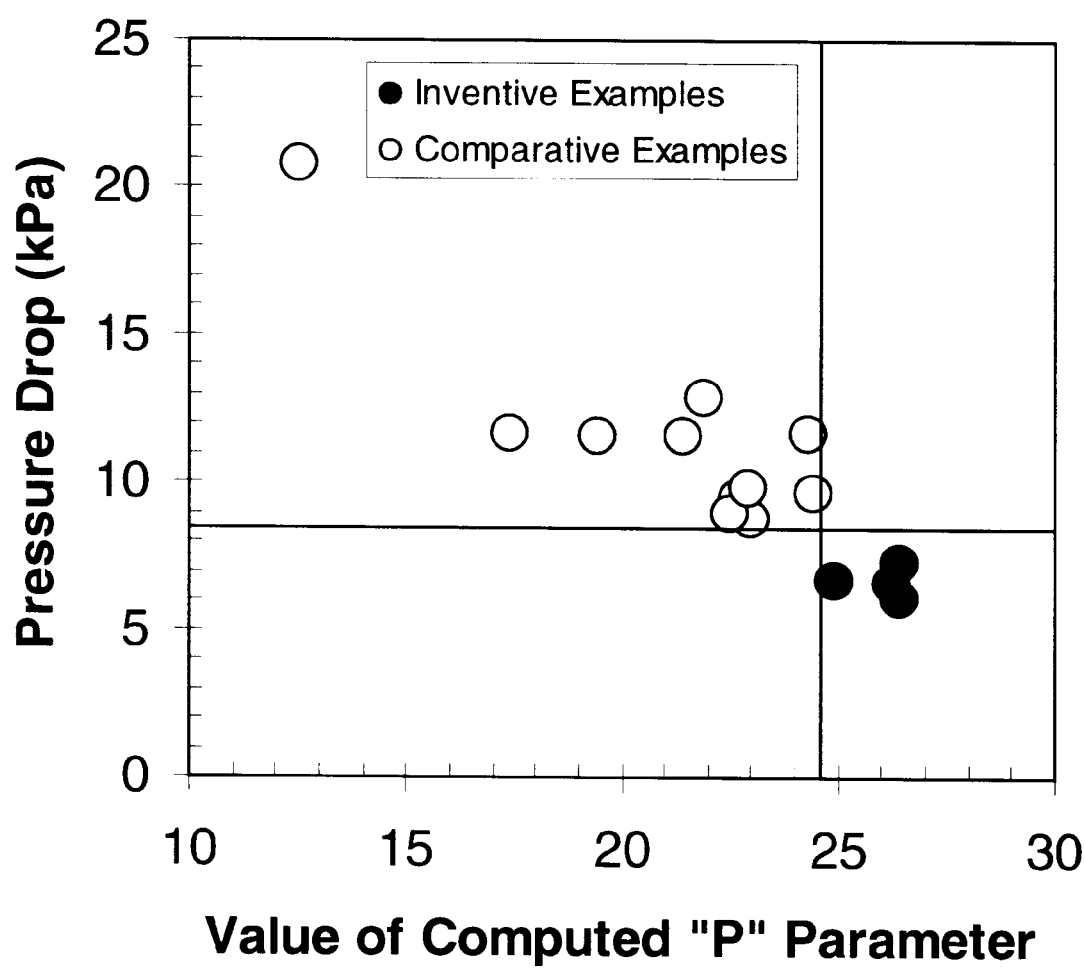
FIG. 3 demonstrates that low pressure drops, less than 8.5 kPa, at 5 g/l soot loading and 26.25 scfm flow rate are associated with high computed "P" parameters, greater than 24.6.

FIG. 3 demonstrates that examples with calculated "P" parameters greater than 24.6 are associated with pressure drops less than 8.5 kPa as measured at a soot loading of 5 g/l and a flow rate of 26.25 scfm.

Figure 4:
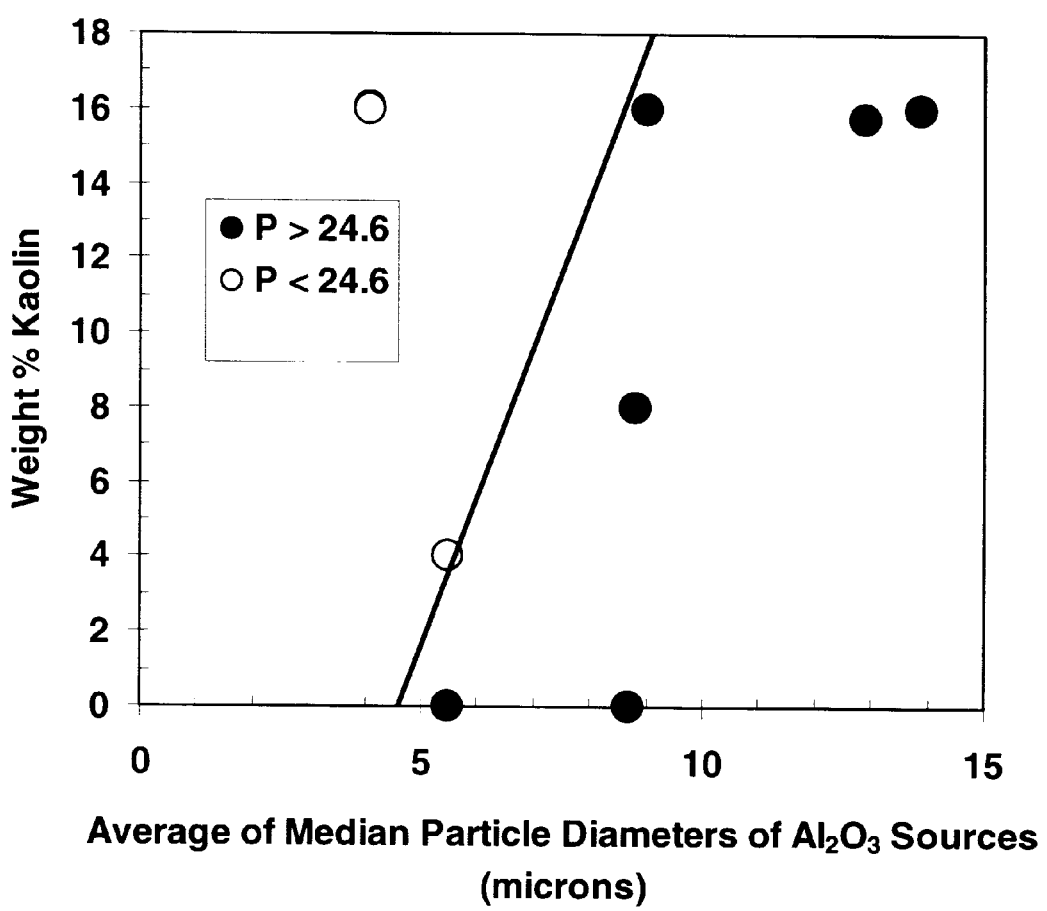
FIG. 4 shows that the weight percent kaolin in the raw material mixture must be less than 4 (average median particle size of the alumina sources)−18.4 when a 23 micron talc and 25 micron silica are used in order to achieve a "P" parameter greater than 24.6.

FIG. 4 illustrates that the amount of kaolin in a raw material mixture that contain a 23 micron talc and a 25 micron silica must be less than 4.0 (average median particle size of the alumina sources)–18.4 in order to achieve "P" parameters greater than 24.6. associated with low pressure drops.

Figure 5:
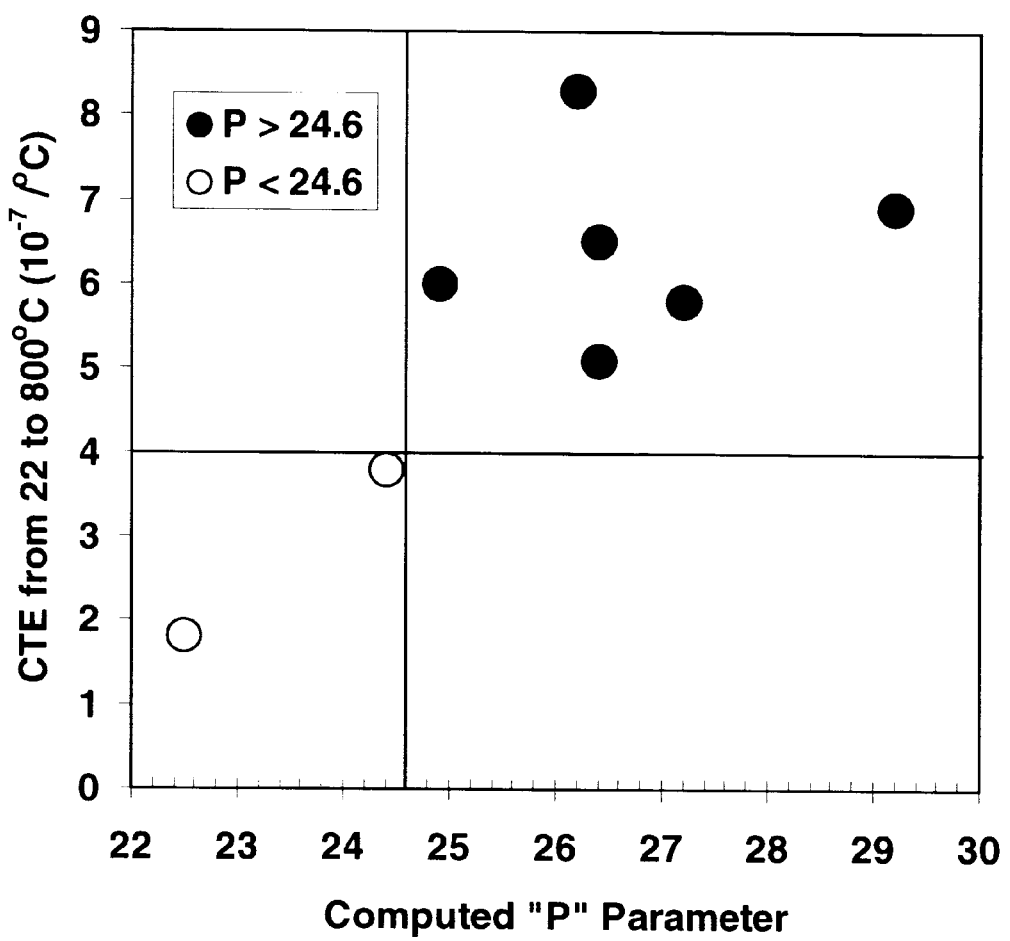
FIG. 5 illustrates that examples with CTEs less than 4.0 have "P" parameters less than 24.6, associated with high pressure drops.

FIG. 5 shows that examples that have CTEs less than 4 also have calculated "P" parameters less than 24.6, associated with high pressure drops.

For application as a diesel particulate filter, it is also necessary that the ceramic filter possess a high percent filtration efficiency, defined as the mass of particles captured by the filter divided by the mass of particles that entered the filter, multiplied by 100. It is desirable that the filter not only have a low pressure drop, but must also have a filtration efficiency of at least 90%. As seen in Table D, Inventive Example D2 exhibits excellent filtration efficiency as measured in the laboratory using artificial carbon soot.

It should be understood that while the present invention has been described in detail with respect to certain illustrative and specific embodiments thereof, it should not be considered limited to such but may be used in other ways without departing from the spirit of the invention and the scope of the appended claims.

TABLE A

Raw Material Properties.

| Raw Material | Median Particle Size (micrometers) |
|---|---|
| Talc A | 50 |
| Talc B | 40 |
| Talc C | 23.2 |
| Talc D | 17.1 |
| Talc E | 14.4 |
| Talc F | 9.7 |
| Talc G | 4.9 |
| MgO A | 3.5 |
| MgO B | 13.8 |
| MgO C | 15.0 |
| MgO D | 0.8 |
| $Mg(OH)_2$ A | 6.5 |
| Kaolin A | 9.9 |
| Kaolin B | 2.9 |
| $\alpha$-$Al_2O_3$ A | 14.8 |
| $\alpha$-$Al_2O_3$ B | 6.2 |
| $\alpha$-$Al_2O_3$ C | 3.5 |
| $\alpha$-$Al_2O_3$ D | 0.6 |
| $\alpha$-$Al_2O_3$ E | 0.6 |
| $Al(OH)_3$ C | 21.0 |
| $Al(OH)_3$ B | 11.5 |
| $Al(OH)_3$ A | 4.6 |
| Boehmite | 0.125 |
| Rho alumina | 5.0 |
| Quartz A | 24.8 |
| Quartz B | 15.7 |
| Quartz C | 4.5 |
| Graphite A | 126 |

TABLE B

Comparative Examples-Compositions.

| EXAMPLE TYPE | B1 Comp. | B2 Comp. | B3 Comp. | B4 Comp. |
|---|---|---|---|---|
| INORGANIC RAW MATERIALS | | | | |
| MgO D | — | — | — | — |
| Talc A | 41.36 | — | — | — |
| Talc C | — | 40.67 | 40.70 | 40.70 |
| Talc D | — | — | — | — |
| Talc E | — | — | — | — |
| Average of Median Particle Sizes of Talc Sources ($\mu$m) | 50 | 23.2 | 23.2 | 23.2 |
| Kaolin A | — | — | — | — |
| Kaolin B | — | 16.04 | 16.00 | 16.00 |
| $\alpha$-$Al_2O_3$ A | — | — | — | — |
| $\alpha$-$Al_2O_3$ B | 29.18 | — | — | — |
| $\alpha$-$Al_2O_3$ C | — | 14.80 | 14.80 | 14.80 |
| $\alpha$-$Al_2O_3$ D | — | — | — | — |
| $Al(OH)_3$ B | — | — | — | — |
| $Al(OH)_3$ A | — | 16.04 | 16.00 | 16.00 |
| Boehmite | 5.72 | — | — | — |
| Average of Median Particle | 5.2 | 4.1 | 4.1 | 4.1 |

TABLE B-continued

Comparative Examples-Compositions.

| EXAMPLE TYPE | B1 Comp. | B2 Comp. | B3 Comp. | B4 Comp. |
|---|---|---|---|---|
| Sizes of Alumina-Forming Sources ($\mu$m) | | | | |
| Quartz A | — | 12.44 | 12.50 | 12.50 |
| Quartz C | 23.74 | — | — | — |
| Average of Median Particle Sizes of Silica Sources ($\mu$m) | 4.5 | 24.8 | 24.8 | 24.8 |
| ORGANIC CONSTITUENTS | | | | |
| Graphite A | — | — | 20.0 | 20.0 |
| Flour | 10.0 | — | — | — |
| Methyl Cellulose | 4.0 | 4.0 | 4.0 | 4.0 |
| Sodium Stearate | — | 1.0 | 1.0 | 1.0 |
| Oleic Acid | 1.0 | — | — | — |
| D-162 | 10.0 | — | — | — |
| SOAK TEMPERATURE (° C.) | 1430 | 1405 | 1415 | 1405 |
| SOAK TIME (hours) | 6 | 6 | 15 | 6 |
| FIRED PROPERTIES | | | | |
| CTE ($10^{-7}$/° C.) 22–800° C. | — | 1.8 | 3.8 | 3.8 |
| Transverse I-Ratio | — | — | — | — |
| Percent Mullite | — | 0.0 | — | 0.0 |
| Percent Corundum | — | 0.0 | — | 0.0 |
| Percent Spinel | — | 3.6 | — | 0.0 |
| Cell Density (cells/in$^2$) | 200 | 200 | 200 | 100 |
| Wall Thickness (inches) | 0.0238 | 0.0114 | 0.0220 | 0.0170 |
| Modulus of Rupture (psi) | — | — | — | — |
| % Filtration Efficiency | — | — | — | — |
| Clean Pressure Drop (kPa) at 26.25 scfm flow rate | 2.3 | 2.4 | 3.0 | 1.9 |
| Pressure Drop (kPa) at 5 g/L Soot Loading, 26.25 scfm flow rate | 8.8 | 9.0 | 9.7 | 11.7 |
| Permeability ($10^{-12}$ m$^2$) | 1.55 | 1.90 | 0.60 | 0.60 |
| Percent Porosity | 52.3 | 42.7 | 50.7 | 48.8 |
| Median Pore Size ($\mu$m) | 29.3 | 8.9 | 11.7 | 12.5 |
| Pore Volume (cm$^3$/g) | 0.4446 | 0.3042 | 0.4188 | 0.3841 |
| Volume of pores with diameters larger than indicated pore size (ml/g) | | | | |
| 1 $\mu$m | 0.4429 | 0.2912 | 0.4114 | 0.3751 |
| 2 $\mu$m | 0.4400 | 0.2711 | 0.4021 | 0.3688 |
| 4 $\mu$m | 0.4216 | 0.2330 | 0.3665 | 0.3461 |
| 10 $\mu$m | 0.3520 | 0.1322 | 0.2576 | 0.2579 |
| 20 $\mu$m | 0.2800 | 0.0495 | 0.0593 | 0.0691 |
| 40 $\mu$m | 0.1480 | 0.0228 | 0.0197 | 0.0206 |
| 60 $\mu$m | 0.0700 | 0.0149 | 0.0127 | 0.0105 |
| 80 $\mu$m | 0.0426 | 0.0111 | 0.0089 | 0.0070 |
| 100 $\mu$m | 0.0245 | 0.0083 | 0.0067 | 0.0050 |
| 120 $\mu$m | 0.0170 | 0.0072 | 0.0053 | 0.0040 |
| 140 $\mu$m | 0.0119 | 0.0057 | 0.0040 | 0.0025 |
| 4–40 $\mu$m as percent of total pore | 61.5 | 69.1 | 82.8 | 86.2 |
| Computed value of P parameter | 23.0 | 22.5 | 24.4 | 24.3 |

TABLE C

Comparative Examples-Compositions.

| EXAMPLE TYPE | C1 Comp. | C2 Comp. | C3 Comp. | C4 Comp. |
|---|---|---|---|---|
| INORGANIC RAW MATERIALS | | | | |
| MgO A | — | — | — | — |
| MgO C | — | — | — | — |
| Talc A | 39.40 | — | 39.71 | — |
| Talc B | — | — | — | 40.70 |
| Talc C | — | 40.00 | — | — |
| Talc D | — | — | — | — |
| Talc E | — | — | — | — |
| Average of Median Particle Sizes of Talc Sources ($\mu$m) | 50 | 23.2 | 50 | 40 |
| Kaolin A | — | 4.00 | — | — |
| Kaolin B | — | — | — | 16.00 |
| $\alpha$-Al$_2$O$_3$ A | — | — | — | — |
| $\alpha$-Al$_2$O$_3$ B | 20.48 | 8.83 | 20.48 | — |
| $\alpha$-Al$_2$O$_3$ C | — | — | — | 14.80 |
| $\alpha$-Al$_2$O$_3$ D | — | 10.25 | — | — |
| Al(OH)$_3$ B | — | 8.43 | — | — |
| Al(OH)$_3$ A | 11.52 | 8.85 | 11.52 | 16.00 |
| Boehmite | 5.49 | — | 5.49 | — |
| Average of Median Particle Sizes of Alumina-Forming Sources ($\mu$m) | 5.6 | 5.5 | 5.6 | 4.1 |
| Quartz A | — | 19.66 | 22.79 | 12.50 |
| Quartz C | 22.79 | — | — | — |
| Average of Median Particle Sizes of Silica Sources ($\mu$m) | 4.5 | 24.8 | 24.8 | 24.8 |
| ORGANIC CONSTITUENTS | | | | |
| Graphite A | — | — | — | 20.00 |
| Flour | — | — | — | — |
| Methyl Cellulose | 4.0 | 4.0 | 4.0 | 4.0 |
| Sodium Stearate | 1.0 | 1.0 | — | 1.0 |
| Oleic Acid | — | — | 1.0 | — |
| D-162 | — | — | 6.0 | — |
| SOAK TEMPERATURE (° C.) | 1430 | 1425 | 1430 | 1430 |
| SOAK TIME (hours) | 6 | 25 | 6 | 6 |
| FIRED PROPERTIES | | | | |
| CTE ($10^{-7}$/° C.) 22–800° C. | 16.7 | — | 14.8 | 16.6 |
| Transverse I-Ratio | — | — | — | — |
| Percent Mullite | 3.8 | — | — | — |
| Percent Corundum | 0.0 | — | — | — |
| Percent Spinel | 2.0 | — | — | — |
| Cell Density (cells/in$^2$) | 200 | 200 | 200 | 200 |
| Wall Thickness (inches) | 0.0116 | 0.0220 | 0.0210 | 0.0216 |
| Modulus of Rupture (psi) | — | — | — | — |
| % Filtration Efficiency | — | — | — | — |
| Clean Pressure Drop (kPa) at 26.25 scfm flow rate | 1.5 | 2.6 | 2.3 | 2.6 |
| Pressure Drop (kPa) at 5 g/L Soot Loading, 26.25 scfm flow rate | 11.7 | 9.8 | 11.6 | 11.6 |
| Permeability ($10^{-12}$ m$^2$) | 1.36 | 0.80 | 1.09 | 1.07 |
| Percent Porosity | 38.9 | 50.3 | 38.8 | 45.5 |
| Median Pore Size ($\mu$m) | 38.5 | 11.6 | 30.6 | 30.6 |
| Pore Volume (cm$^3$/g) | 0.2610 | 0.3595 | 0.2520 | 0.3216 |
| Volume of pores with diameters larger than indicated pore size (ml/g) | | | | |
| 1 $\mu$m | 0.2610 | 0.3191 | 0.2462 | 0.3216 |
| 2 $\mu$m | 0.2610 | 0.3140 | 0.2462 | 0.3216 |
| 4 $\mu$m | 0.2610 | 0.2980 | 0.2462 | 0.3216 |
| 10 $\mu$m | 0.2483 | 0.2130 | 0.2425 | 0.3182 |
| 20 $\mu$m | 0.2150 | 0.0490 | 0.2070 | 0.2598 |
| 40 $\mu$m | 0.1250 | 0.0170 | 0.0774 | 0.0938 |
| 60 $\mu$m | 0.0648 | 0.0110 | 0.0349 | 0.0406 |
| 80 $\mu$m | 0.0378 | 0.0080 | 0.0205 | 0.0219 |
| 100 $\mu$m | 0.0235 | 0.0060 | 0.0139 | 0.0138 |
| 120 $\mu$m | 0.0170 | 0.0050 | 0.0100 | 0.0090 |
| 140 $\mu$m | 0.0110 | 0.0040 | 0.0069 | 0.0058 |
| 4–40 $\mu$m as percent of total pore | 52.1 | 78.2 | 67.0 | 70.8 |
| Computed value of P parameter | 17.4 | 22.9 | 19.4 | 21.4 |

TABLE D

Inventive Examples-Compositions.

| EXAMPLE TYPE | D1 Inv. | D2 Inv. | D3 Inv. | D4 Inv. | D5 Inv. | D6 Inv. |
|---|---|---|---|---|---|---|
| INORGANIC RAW MATERIALS | | | | | | |
| Talc B | — | — | — | — | — | — |
| Talc C | 39.76 | 39.76 | 40.23 | 40.70 | 40.11 | 40.70 |
| Talc G | — | — | — | — | — | — |
| Average of Median Particle Sizes of Talc Sources ($\mu$m) | 23.2 | 23.2 | 23.2 | 23.2 | 23.2 | 23.2 |
| Kaolin A | — | — | 8.00 | — | — | — |
| Kaolin B | — | — | — | 16.00 | 15.77 | 16.00 |
| $\alpha$-Al$_2$O$_3$ B | 20.50 | 20.50 | 17.65 | 14.80 | — | 14.80 |
| $\alpha$-Al$_2$O$_3$ D | — | — | — | — | — | — |
| $\alpha$-Al$_2$O$_3$ E | — | — | — | — | — | — |
| Al(OH)$_3$ C | — | — | — | — | 15.77 | 16.00 |
| Al(OH)$_3$ A | — | 17.70 | 16.85 | 16.00 | — | — |
| Al(OH)$_3$ B | 17.70 | — | — | — | — | — |
| Rho alumina | — | — | — | — | 16.03 | — |
| Boehmite | — | — | — | — | — | — |
| Average of Median Particle Sizes of Alumina-Forming Sources ($\mu$m) | 5.5 | 8.7 | 8.8 | 9.0 | 12.9 | 13.9 |
| Quartz A | 22.04 | 22.04 | 17.27 | 12.50 | 12.32 | 12.50 |
| Quartz B | — | — | — | — | — | — |
| Quartz C | — | — | — | — | — | — |
| Average of Median Particle Sizes of Silica Sources ($\mu$m) | 24.8 | 24.8 | 24.8 | 24.8 | 24.8 | 24.8 |
| ORGANIC CONSTITUENTS | | | | | | |
| Methyl Cellulose | 5.0 | 5.0 | 4.0 | 4.0 | 4.0 | 4.0 |
| Sodium Stearate | — | — | 1.0 | 1.0 | 1.0 | 1.0 |
| Oleic Acid | 0.6 | 0.6 | — | — | — | — |
| D-162 | 6.0 | 6.0 | — | — | — | — |
| SOAK TEMPERATURE (° C.) | 1425 | 1425 | 1425 | 1425 | 1425 | 1425 |
| SOAK TIME (hours) | 25 | 25 | 25 | 25 | 25 | 25 |
| FIRED PROPERTIES | | | | | | |
| CTE ($10^{-7}$/° C.) 22–800° C. | 5.8 | 6.9 | 6.5 | 6.0 | 8.3 | 5.1 |
| Transverse I-Ratio | 0.91 | 0.88 | — | — | — | — |
| Percent Mullite | 1.4 | 1.9 | — | — | — | — |
| Percent Corundum | 0.0 | 0.0 | — | — | — | — |
| Percent Spinel | 1.6 | 2.1 | — | — | — | — |
| Cell Density (cells/in$^2$) | 200 | 200 | 200 | 200 | 200 | 200 |
| Wall Thickness (inches) | | | | | | |
| Modulus of Rupture (psi) | — | — | — | — | — | — |
| % Filtration Efficiency | — | — | 98.8 | — | — | — |
| Clean Pressure Drop (kPa) at 26.25 scfm flow rate | — | — | 2.1 | 2.2 | 2.4 | 2.4 |
| Pressure Drop (kPa) at 5 g/L Soot Loading, 26.25 scfm flow rate | — | — | 7.3 | 6.7 | 6.6 | 6.1 |
| Permeability ($10^{-12}$ m$^2$) | 1.56 | 2.63 | 1.28 | 1.20 | 1.33 | 1.50 |
| Percent Porosity | 52.4 | 52.1 | 49.4 | — | — | — |
| Median Pore Size ($\mu$m) | 19.2 | 22.5 | 14.7 | — | — | — |
| Pore Volume (cm$^3$/g) | 0.4191 | 0.4143 | 0.3907 | 0.2972 | 0.3551 | 0.3498 |
| Volume of pores with diameters larger than indicated pore size (ml/g) | | | | | | |
| 1 $\mu$m | 0.4079 | 0.4077 | 0.3859 | 0.2967 | 0.3538 | 0.3471 |
| 2 $\mu$m | 0.4079 | 0.4077 | 0.3843 | 0.2956 | 0.3522 | 0.3457 |
| 4 $\mu$m | 0.4079 | 0.4077 | 0.3790 | 0.2925 | 0.3476 | 0.3417 |
| 10 $\mu$m | 0.3708 | 0.3956 | 0.3230 | 0.2733 | 0.3014 | 0.2993 |
| 20 $\mu$m | 0.1886 | 0.2612 | 0.1210 | 0.1039 | 0.1095 | 0.1300 |
| 40 $\mu$m | 0.0449 | 0.0545 | 0.0330 | 0.0230 | 0.0262 | 0.0279 |
| 60 $\mu$m | 0.0251 | 0.0301 | 0.0190 | 0.0134 | 0.0157 | 0.0165 |
| 80 $\mu$m | 0.0180 | 0.0211 | 0.0130 | 0.0095 | 0.0113 | 0.0116 |
| 100 $\mu$m | 0.0131 | 0.0151 | 0.0100 | 0.0076 | 0.0091 | 0.0090 |
| 120 $\mu$m | 0.0108 | 0.0117 | 0.0070 | 0.0060 | 0.0071 | 0.0072 |
| 140 $\mu$m | 0.0085 | 0.0092 | 0.0050 | 0.0043 | 0.0052 | 0.0052 |
| 4–40 $\mu$m as percent of total pore | 86.6 | 85.3 | 86.6 | 90.7 | 90.5 | 89.7 |
| Computed value of P parameter | 27.2 | 29.1 | 26.4 | 24.9 | 26.2 | 26.4 |

What is claimed is:

1. A ceramic comprising predominately a cordierite-type phase approximating the stoichiometry Mg$_2$Al$_4$Si$_5$O$_{18}$ and having a coefficient of thermal expansion (25–800° C.) of greater than $4 \times 10^{-7}$/° C. and less than $13 \times 10^{-7}$/° C. and a permeability and a pore size distribution which satisfy the relation 2.108 (permeability)+18.511 (total pore volume)+0.1863 (percentage of total pore volume comprised of pores between 4 and 40 micrometers)>24.6.

2. The structure of claim 1 wherein the permeability is at least $0.70 \times 10^{-12}$ m$^2$.

3. The structure of claim 2 wherein the permeability is at least $1.0 \times 10^{-12}$ m$^2$.

4. The structure of claim 3 wherein the permeability is at least $1.5 \times 10^{-12}$ m$^2$.

5. The structure of claim 4 wherein the permeability is at least $2.0 \times 10^{-12}$ m$^2$.

6. The structure of claim 1 wherein the total pore volume is at least 0.25 ml/g.

7. The structure of claim 6 wherein the total pore volume is at least 0.30 ml/g.

8. The structure of claim 7 wherein the total pore volume is at least 0.35 ml/g.

9. The structure of claim 1 wherein the percentage of total pore volume comprised of pores between 4 and 40 micrometers is at least 85%.

10. The structure of claim 9 wherein the percentage of total pore volume comprised of pores between 4 and 40 micrometers is at least 90%.

11. The structure of claim 1 wherein the coefficient of thermal expansion (25–800° C.) is greater than $4 \times 10^{-7}$/° C. and less than $10 \times 10^{-7}$/° C.

12. The structure of claim 11 wherein the coefficient of thermal expansion (25–800° C.) is greater than $4 \times 10^{-7}$/° C. and less than $8 \times 10^{-7}$/° C.

13. The structure of claim 12 wherein the coefficient of thermal expansion (25–800° C.) is greater than $4 \times 10^{-7}$/° C. and less than $6 \times 10^{-7}$/° C.

14. The structure of claim 1 wherein the structure is used for filtering particulates from diesel engine exhaust.

15. A diesel particulate filter comprising a cordierite body having a CTE (25–800° C.) of greater than $4 \times 10^{-7}$/° C. and less than $13 \times 10^{-7}$/° C., a bulk filter density of at least 0.60 g/cm³, and a pressure drop in Kpa across the filter of less than 8.9–0.035 (number of cells per square inch)+300 (cell wall thickness in inches) at an artificial carbon soot loading of 5 grams/liter and a flow rate of 26 scfm, wherein the filter has the shape of a honeycomb, the honeycomb having an inlet end and an outlet end, and a multiplicity of cells extending from the inlet end to the outlet end, the cells having porous walls, wherein part of the total number of cells at the inlet end are plugged along a portion of their lengths, and the remaining part of cells that are open at the inlet end are plugged at the outlet end along a portion of their lengths, so that an engine exhaust stream passing through the cells of the honeycomb from the inlet end to the outlet end flows into the open cells, through the cell walls, and out of the structure through the open cells at the outlet end.

16. The diesel particulate filter of claim 15 wherein the pressure drop is less than 12.9 kPa at an artificial carbon soot loading of 5 grams/liter and a flow rate of 26.65 scfm for a cell density of 100 cells per square inch and a cell wall thickness of about 0.025 inches.

17. The diesel particulate filter of claim 15 wherein the pressure drop is less than 7.9 kPa at an artificial carbon soot loading of 5 grams/liter and a flow rate of 26.65 scfm for a cell density of about 200 cells per square inch and a cell wall thickness of about 0.020 inches.

18. The diesel particulate filter of claim 15 wherein the bulk filter density is 0.68 g/cm³.

19. The diesel particulate filter of claim 18 wherein the bulk filter density is 0.77 g/cm³.

20. The filter of claim 15 wherein the coefficient of thermal expansion (25–800° C.) is greater than $4 \times 10^{-7}$/° C. and less than $10 \times 10^{-7}$/° C.

21. The filter of claim 20 wherein the coefficient of thermal expansion (25–800° C.) is greater than $4 \times 10^{-7}$/° C. and less than $8 \times 10^{-7}$/° C.

22. The filter of claim 21 wherein the coefficient of thermal expansion (25–800° C.) is greater than $4 \times 10^{-7}$/° C. and less than $6 \times 10^{-7}$/° C.

23. A wall-flow filter comprising a cordierite body having a CTE (25–800° C.) of greater than $4 \times 10^{-7}$/° C. and less than $13 \times 10^{-7}$/° C., a permeability and a pore size distribution which satisfy the relation 2.108 (permeability)+18.511 (total pore volume)+0.1863 (percentage of total pore volume comprised of pores between 4 and 40 micrometers)>24.6, such that at an artificial carbon soot loading of 5 grams/liter and a flow rate of 26 scfm, the filter has a pressure drop in kPa across the filter of less than 8.9–0.035 (number of cells per square inch)+300 (cell wall thickness in inches), wherein the filter has a bulk filter density of at least 0.60 g/cm³, wherein the filter has the shape of a honeycomb, the honeycomb having an inlet end and an outlet end, and a multiplicity of cells extending from the inlet end to the outlet end, the cells having porous walls, wherein part of the total number of cells at the inlet end are plugged along a portion of their lengths, and the remaining part of cells that are open at the inlet end are plugged at the outlet end along a portion of their lengths, so that an engine exhaust stream passing through the cells of the honeycomb from the inlet end to the outlet end flows into the open cells, through the cell walls, and out of the structure through the open cells at the outlet end.

24. The filter of claim 23 further having a volumetric heat capacity of at least 0.67 J cm⁻³ K⁻¹ as measured at 500° C.

25. The filter of claim 24 wherein the volumetric heat capacity is at least 0.76 J cm⁻³ K⁻¹ as measured at 500° C.

26. The filter of claim 25 wherein the volumetric heat capacity is at least 0.85 J cm⁻³ K⁻¹ as measured at 500° C.

27. The filter of claim 24 wherein the permeability is at least $0.70 \times 10^{-12}$ m².

28. The filter of claim 24 wherein the permeability is at least $1.0 \times 10^{-12}$ m².

29. The filter of claim 28 wherein the permeability is at least $1.5 \times 10^{-12}$ m².

30. The filter of claim 29 wherein the permeability is at least $2.0 \times 10^{-12}$ m².

31. The filter of claim 24 wherein the total pore volume is at least 0.25 ml/g.

32. The filter of claim 31 wherein the total pore volume is at least 0.30 ml/g.

33. The filter of claim 32 wherein the total pore volume is at least 0.35 ml/g.

34. The filter of claim 24 wherein the percentage of total pore volume comprised of pores between 4 and 40 micrometers is at least 85%.

35. The filter of claim 34 wherein the percentage of total pore volume comprised of pores between 4 and 40 micrometers is at least 90%.

36. The filter of claim 24 wherein the coefficient of thermal expansion (25–800° C.) is greater than $4 \times 10^{-7}$/° C. and less than $10 \times 10^{-7}$/° C.

37. The filter of claim 36 wherein the coefficient of thermal expansion (25–800° C.) is greater than $4 \times 10^{-7}$/° C. and less than $8 \times 10^{-7}$/° C.

38. The filter of claim 37 wherein the coefficient of thermal expansion (25–800° C.) is greater than $4 \times 10^{-7}$/° C. and less than $6 \times 10^{-7}$/° C.

39. The filter of claim 24 wherein the pressure drop is less than 12.9 kPa at an artificial carbon soot loading of 5 grams/liter and a flow rate of 26.65 scfm for a cell density of 100 cells per square inch and a cell wall thickness of about 0.025 inches.

40. The filter of claim 24 wherein the pressure drop is less than 7.9 kPa at an artificial carbon soot loading of 5 grams/liter and a flow rate of 26.65 scfm for a cell density of about 200 cells per square inch and a cell wall thickness of about 0.020 inches.

41. A method of making a cordierite body comprising:

a) forming a mixture of raw materials which include:
 a talc source having a morphology index greater than about 0.75 and an average particle size greater than 15 micrometers but less than 35 micrometers;
 an alumina source having an median particle size between 4.6 and 25 micrometers;
 a silica source having a median particle size between 10 and 35 micrometers;

b) shaping the mixture into a green structure;

c) firing the green structure to produce a fired structure comprising predominantly a cordierite-type phase approximating the stoichiometry $Mg_2Al_4Si_5O_{18}$ and having a coefficient of thermal expansion (25–800° C.) of greater than $4 \times 10^{\times 7/°}$ C. and less than $13 \times 10^{-7}/°$ C. and a permeability and a pore size distribution which satisfy the relation 2.108 (permeability)+18.511 (total pore volume)+0.1863(percentage of total pore volume comprised of pores between 4 and 40 micrometers) >24.6.

42. The method of claim 41 wherein the raw materials further include kaolin in an amount of not more than the quantity (in weight percentage) given by the equation 4.0 (median particle size of the alumina source)–18.4.

43. The method of claim 41 wherein the talc source has a median particle size of between 25 and 35 micrometers.

44. The method of claim 41 wherein the alumina source is selected from the group consisting of alpha-alumina, gamma-alumina, rho-alumina, boehmite, aluminum hydroxide and combinations thereof.

45. The method of claim 44 wherein the alumina source comprises at least 10 percent based on raw material weight aluminum hydroxide.

46. The method of claim 41 wherein the talc source has a median particle size of 18–30 micrometers and the alumina source has a median particle size of 7 to 15 micrometers.

47. The method of claim 41 wherein the silica source is selected from the group consisting of quartz, cristobalite, fused silica, sol-gel silica, zeolite, diatomaceous silica, and combinations thereof.

48. The method of claim 41 wherein the mixture is shaped by extrusion.

49. The method of claim 41 wherein the green structure is fired to a maximum temperature of 1405–1430° C., at a rate of between 15 and 100° C./hour, with a hold at the maximum temperature of between 6 to 25 hours.

* * * * *